United States Patent [19]

Ohsumi

[11] 4,238,778

[45] Dec. 9, 1980

[54] SYSTEM FOR WARNING THE APPROACH OF AN EMERGENCY VEHICLE

[76] Inventor: Kinya Ohsumi, Hamamatsu-shi, Shizuoka-ken, Japan

[21] Appl. No.: 832,286

[22] Filed: Sep. 12, 1977

Related U.S. Application Data

[63] Continuation-in-part of Ser. No. 634,164, Nov. 21, 1975, abandoned.

[51] Int. Cl.[3] .......... G08G 1/00; H04B 1/034

[52] U.S. Cl. .......... 340/33; 455/99; 455/227; 455/345

[58] Field of Search .......... 340/32, 34, 33, 694, 340/696; 343/225, 226, 227, 228; 235/92 EV; 325/363, 364, 55, 64, 466, 117, 54, 400, 398, 319, 406, 312; 455/352, 227, 68, 99, 57, 232, 238, 345

[56] References Cited

U.S. PATENT DOCUMENTS

| | | | |
|---|---|---|---|
| 2,314,883 | 3/1943 | Herson | 325/364 |
| 2,437,876 | 3/1948 | Cohn | 325/364 |
| 2,886,796 | 5/1959 | Wallace | 325/364 |
| 2,994,765 | 8/1961 | Adam | 340/32 |
| 3,210,665 | 10/1965 | Street | 325/55 |
| 3,470,479 | 6/1969 | Sanc | 325/364 |
| 3,473,127 | 10/1969 | Williams et al. | 325/364 |
| 3,710,313 | 1/1973 | Kimball et al. | 340/33 |
| 3,784,970 | 1/1974 | Simpkin | 343/225 |
| 3,796,864 | 3/1974 | Sampey | 340/33 |
| 3,854,119 | 12/1974 | Friedman et al. | 340/33 |
| 3,876,940 | 4/1975 | Wickford et al. | 340/33 |
| 4,100,529 | 7/1978 | Evans | 340/32 |

*Primary Examiner*—John W. Caldwell, Sr.
*Assistant Examiner*—James J. Groody
*Attorney, Agent, or Firm*—Pearne, Gordon, Sessions, McCoy & Granger

[57] ABSTRACT

An electronic transmitter-receiver system for warning a motor vehicle driver of the approach of an emergency motor vehicle such as an ambulance is disclosed. A transmitter equipped emergency motor vehicle transmits an omnidirectional, short range, radio frequency warning signal. A warning signal receiver associated with a motor vehicle proximate to the approaching emergency motor vehicle emits an audible warning within the passenger compartment of the motor vehicle in response to the radio frequency warning signal. The audible warning is heard by the driver of the motor vehicle thus alerting him to the impending traffic hazards associated with an approaching emergency motor vehicle. The intensity of the audible warning increases as the distance between the emergency motor vehicle and the motor vehicle to be warned decreases. The warning signal receiver includes means for disabling selected sound producing devices within the passenger compartment of the motor vehicle, such as a radio or a ventilation fan, in response to the warning signal.

1 Claim, 3 Drawing Figures

SYSTEM FOR WARNING THE APPROACH OF AN EMERGENCY VEHICLE

BACKGROUND OF THE INVENTION

This is a continuation-in-part of application Ser. No. 634,164, filed Nov. 21, 1975, now abandoned.

This invention relates generally to a system for warning a motor vehicle driver of the approach of an emergency motor vehicle and, more particularly, to an electronic transmitter-receiver system wherein a warning signal receiver associated with a motor vehicle to be warned receives a radio frequency warning signal transmitted by a warning signal transmitter associated with an approaching emergency motor vehicle.

In order to assure right of way to approaching emergency motor vehicles, such vehicles are equipped with audible and visual warning devices such as sirens and flashing red lights. Other motor vehicles proximate to an approaching emergency motor vehicle can take appropriate action to provide a safe right of way for the emergency vehicle, once the drivers of these other vehicles are aware of the siren and/or flashing lights of the approaching emergency vehicle.

A timely warning especially depends upon a driver's ability to hear an emergency vehicle siren which is external to and disconnected from the passenger compartment of the vehicle to be warned. Improved vehicle construction with respect to soundproofing, and increased ambient noise within the passenger compartment due to car radios and stereos, ventilation fans, and the like, have made it more difficult for the driver to hear the audible siren warning of an approaching emergency vehicle, thus increasing the probability that a clear right of way may be delayed for the emergency vehicle. Further, a dangerous traffic condition can arise where an unwarned driver obstructs an emergency vehicle which is often traveling at high speed.

SUMMARY OF THE INVENTION

The present invention provides an electronic transmitter-receiver system which includes a warning signal receiver associated with a motor vehicle to be warned of an approaching emergency motor vehicle, and a transmitter associated with the approaching emergency motor vehicle.

In accordance with the present invention, the warning signal receiver is active whenever its associated motor vehicle is operating. The transmitter associated with the approaching emergency motor vehicle emits a warning signal at a predetermined radio frequency, preferably in the VHF or UHF range. In accordance with a preferred embodiment of the present invention, the transmitter is of relatively low power and has a limited effective range. The receiver, tuned to the predetermined radio frequency, detects the transmitted warning signal when the emergency motor vehicle and the motor vehicle to be warned are within approximately 100 meters of each other. In response to the received radio frequency warning signal, the receiver emits an audible warning within the passenger compartment of the associated motor vehicle thus alerting the driver.

The audible warning emitted by the radio receiver varies in intensity as a function of the distance between the emergency motor vehicle equipped with the transmitter and the motor vehicle to be warned equipped with the receiver, such that the audible warning increases in intensity as the distance between the transmitter vehicle and receiver vehicle decreases. Such a feature allows the driver to advantageously sense the approach distance of the emergency vehicle due to the varying intensity of the audible warning signal.

In accordance with the present invention, the receiver further includes switching means arranged to disable other sound producing devices within the passenger compartment of its associated motor vehicle, such as a radio, ventilating fan, or the like, during the period in which a warning signal transmission is being received. This feature serves to reduce the ambient noise within the passenger compartment thus enhancing the driver's ability to hear the audible warning emitted by the receiver.

BRIEF DESCRIPTION OF THE DRAWING

These and other features of the invention are incorporated in the preferred embodiment of the invention shown in the drawing wherein.

DESCRIPTION OF THE PREFERRED EMBODIMENT

Figures 1, 2, 3:
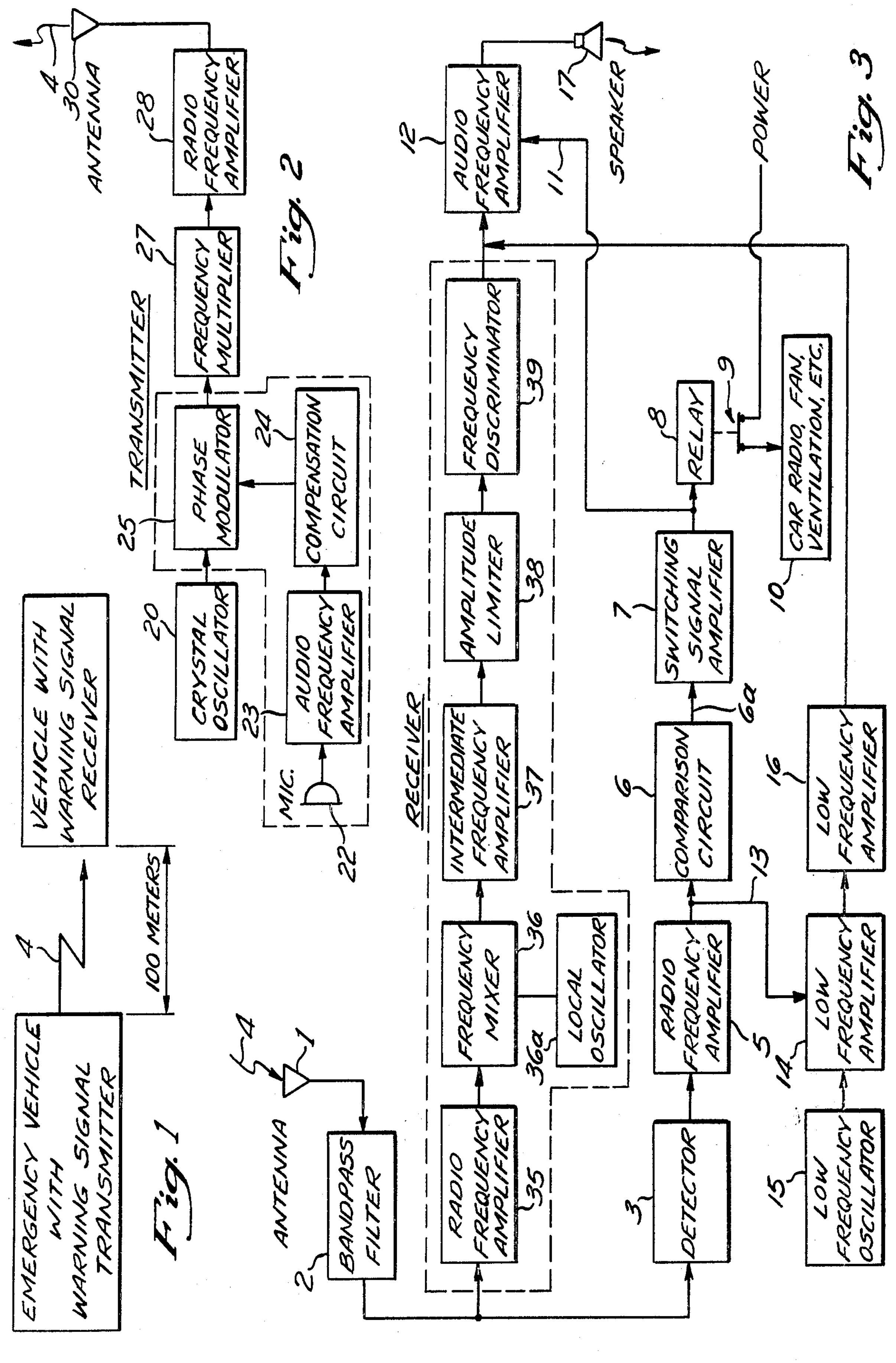
FIG. 1 illustrates in block diagram form an emergency vehicle equipped with a warning signal transmitter and a vehicle equipped with a warning signal receiver according to the present invention.
FIG. 2 illustrates in block diagram form a warning signal transmitter in accordance with the present invention.
FIG. 3 illustrates in block diagram form a warning signal receiver in accordance with the present invention.

Referring to the drawing in greater detail, FIG. 1 illustrates an emergency vehicle equipped with a warning signal transmitter. A radio frequency warning signal 4 is continuously transmitted from the emergency motor vehicle. When the emergency motor vehicle approaches to within 100 meters of a vehicle equipped with a warning signal receiver, the warning signal 4 is detected by the receiver and the driver of the receiver equipped vehicle is advantageously warned that an emergency vehicle is approaching by an audible signal emitted by the receiver within the passenger compartment.

FIG. 2 illustrates a preferred embodiment of the warning signal transmitter associated with the approaching emergency motor vehicle. The transmitter includes a conventional crystal oscillator 20 providing a carrier signal of predetermined frequency.

If desired, the warning signal transmitter may include a voice capability wherein the driver of the emergency motor vehicle can direct by voice commands the driver of a motor vehicle to be warned. Referring to FIG. 2, such a voice capability is provided by a microphone 22 which provides a voice signal to an audio frequency amplifier 23. The amplified voice signal is fed to a phase modulator 25 via a conventional compensation circuit 24. The amplified and compensated voice signal frequency modulates the carrier frequency provided by the crystal oscillator in a well known manner. The frequency modulated carrier signal provided by the phase modulator 25 is fed to a frequency multiplier 27 and then to a radio frequency amplifier 28. The frequency multiplier 27 serves to increase the frequency of the modulated carrier signal preferably to within the VHF or UHF range, such VHF or UHF carrier signal constituting the warning signal 4. The radio frequency amplifier 28 serves to provide the radio-frequency warning signal 4 to an omnidirectional antenna 30 at a constant power level.

It should be noted that the circuit elements (enclosed by the dashed line in FIG. 1) providing voice capability may be deleted where such voice capability is undesirable. Further, appropriate switches may be used to disable the voice capability elements when desirable. For example, an on-off switch could be provided between the microphone 22 and the amplifier 23.

It should further be noted that in accordance with the present invention a frequency modulated warning signal in the VHF or UHF range is desirable in order to preclude electromagnetic interference problems associated with vehicle ignition noises.

FIG. 3 illustrates a preferred embodiment of the warning signal receiver which includes an omnidirectional antenna 1 for receiving the radio-frequency warning signal 4. The warning signal 4, induced into the antenna 1, is fed via a bandpass filter 2 to a detector 3. The bandpass filter 2 serves in a conventional manner to reject unwanted frequencies, while being tuned to allow the warning signal to pass therethrough. The detected warning signal is passed from the detector 3 and amplified to a suitable level by a radio frequency amplifier 5. The amplified warning signal is then fed to a comparison circuit 6 whose output *6a* provides an ON switching signal when the intensity of the amplified warning signal presented to the comparison circuit 6 exceeds a predetermined threshold signal of predetermined intensity corresponding to a predetermined approach distance of the warning transmitter equipped emergency motor vehicle. For example, the predetermined threshold of the comparison circuit 6 can be set to correspond to an emergency vehicle approach distance of 100 meters. By way of example, the comparison circuit 6 can be of the conventional Schmitt-trigger type.

The ON switching signal supplied by the comparison circuit 6 is applied to a switching signal amplifier 7 which amplifies the ON switching signal. The switching signal amplifier 7 further serves to provide a delay function wherein the ON switching signal must be applied to the amplifier for a short period of time before a corresponding amplified ON switching signal is provided by the switching signal amplifier 7. Conversely, the amplified ON switching signal will cease only after the ON switching signal applied by the comparison circuit is eliminated for a predetermined period of time.

The amplified ON switching signal provided by the switching signal amplifier 7 serves to actuate a relay 8 having normally closed switching contacts 9 which open in response to the amplified ON switching signal so as to disable selected sound producing devices within the passenger compartment of the motor vehicle to be warned, such as a car radio, ventilation fan, or the like 10. As illustrated in FIG. 3, disabling can be accomplished by disconnecting the selected sound producing devices from their respective power source, wherein the switching contacts 9 are series inserted between power source and the sound producing device.

The amplified ON switching signal is further applied via line 11 to an audio frequency amplifier 12.

The amplified warning signal provided by the radio frequency amplifier 5 is also fed via line 13 to a variable gain low frequency amplifier 14 which amplifies an audio frequency tone provided by a constant power low frequency oscillator 15.

The gain of the low frequency amplifier 14 increases as the intensity of the amplified warning signal increases, such increase being indicative a decreasing distance between the warning receiver equipped vehicle and the warning transmitter equipped emergency vehicle.

The amplified audio frequency tone supplied by the low frequency amplifier 14 is applied via another low frequency amplifier 16 to the audio frequency amplifier 12 which in turn supplies the amplified audio frequency tone to a loud speaker 17 located in the passenger compartment of the warning receiver equipped vehicle. It should be noted that the amplified audio frequency tone is applied to the loudspeaker 17 only if the audio frequency amplifier is enabled by the appropriate amplified ON switching signal applied via line 11.

From the foregoing explanation it is clear that as a warning transmitter equipped vehicle approaches a warning receiver equipped vehicle, the audio frequency tone generated by the loudspeaker 17 will increase in intensity provided the threshold signal associated with the comparison circuit 6 has been exceeded, such a threshold feature, and the previous delaying feature of the switching signal amplifier 7, serving to eliminate false warning signals.

Another desirable feature of the present invention lies in the use of the low frequency oscillator 15 which provides the audio frequency tone heard by the driver in the passenger compartment. Such a feature precludes the need for audio frequency modulation of the radio-frequency warning signal 4 transmitted by the receiver, since the audio frequency tone is inherently provided by the warning receiver circuitry.

Warning receiver voice capability elements complementing those voice capability elements noted above with regard to the transmitter circuitry illustrated in FIG. 2 are similarly enclosed by dashed lines as shown in FIG. 3.

The warning signal receiver voice capability elements include a radio frequency amplifier 35 responsive to the warning signal 4 provided via the bandpass filter 2. The amplified radio frequency warning signal is then fed to a frequency mixer 36 associated with a local oscillator *36a*. Using conventional superheterodyne techniques, an intermediate frequency signal is applied to an amplitude limiter 38 via an intermediate frequency amplifier 37. The amplitude limiter 38 prevents intermediate frequency signal peaks from exceeding a predetermined level.

The resultant amplitude limited intermediate frequency signal, which as heretofore explained may be voice modulated by the phase modulator 25 (see FIG. 2), is fed to a frequency discriminator which effectively demodulates the intermediate frequency signal provided via the amplitude limiter 38. The demodulated intermediate frequency signal is fed to loud speaker 17 via the audio frequency amplifier 12 when the amplified ON switching signal is applied via line 11 to the audio frequency amplifier 12. The voice commands spoken by an emergency vehicle driver into the microphone 22 are heard through the loudspeaker 17 by the driver of the vehicle to be warned. Thus the emergency vehicle driver can effectively direct traffic to facilitate passage of the emergency vehicle therethrough.

Further, for improving the reliability and easiness of operation, the following points can be considered:

(1) To reduce error operations caused by electric waves other than the object signal or noises, the transmitter output can be sent separately, in L-channel and R-channel, as in the publicly-known stereophonic broadcasting.

For instance, if L-channel is modulated with the voice and R-channel is modulated with a proper signal, in the receiver, the voice signal on L-channel is allowed to pass through as in the basic construction of the present invention and R-channel can be used to identify the object signal. When an identification can not be obtained, the amplifier 7 is made non-operable. Likewise, there is also a method in which the transmitter output is modulated with the voice signal and a proper signal using a frequency other than voice frequency, and the respective signals are used after being separated by a filter in the receiver.

(2) When the voice output is produced, the warning signal from the low-frequency oscillator 15 is lowered by the reduction of the amplification degree of the amplifier 14 or 16 thereby making the voice to be more easily heard.

(3) If the audio frequency amplifier 12 is made to be operated with a proper signal other than an emergency motor vehicle, irrespectively of field strength, for not only communicating the approach of an emergency motor vehicle but also for communicating information to a wide range of general motor vehicles, the application of the present invention will be expanded.

Although a preferred embodiment of this invention is illustrated, it is to be understood that various modification and rearrangements of elements may be resorted to without departing from the scope of the invention claimed herein.

What is claimed is:

1. A system for warning the approach of an emergency motor vehicle comprising:

a warning signal transmitter constructed and arranged for mounting on an emergency motor vehicle, said transmitter including means for generating and transmitting a radio frequency warning signal; and a warning signal receiver constructed and arranged for mounting on a motor vehicle to be warned of the approach of the emergency motor vehicle, said receiver including means for detecting said radio frequency warning signal, means for comparing the intensity of said detected signal to a threshold signal of predetermined intensity, said means for comparing providing an ON switching signal only when the intensity of said detected signal exceeds the predetermined intensity of said threshold signal, means for generating an audible frequency tone similar to a siren sound of the emergency motor vehicle, means for emitting the audible frequency tone within the passenger compartment of said vehicle to be warned only when said ON switching signal is provided, means for varying the intensity of said audible frequency tone in proportion to the intensity of said detected signal, and means for disabling selected sound producing sources within said passenger compartment when said ON switching signal is provided.

* * * * *